March 15, 1966 C. W. CAPEHART 3,241,060
OSCILLATOR-DETECTOR FOR MEASURING IMPEDANCE VARIATIONS IN LC-TRANSFORMER COUPLED LOADS
Filed April 27, 1961
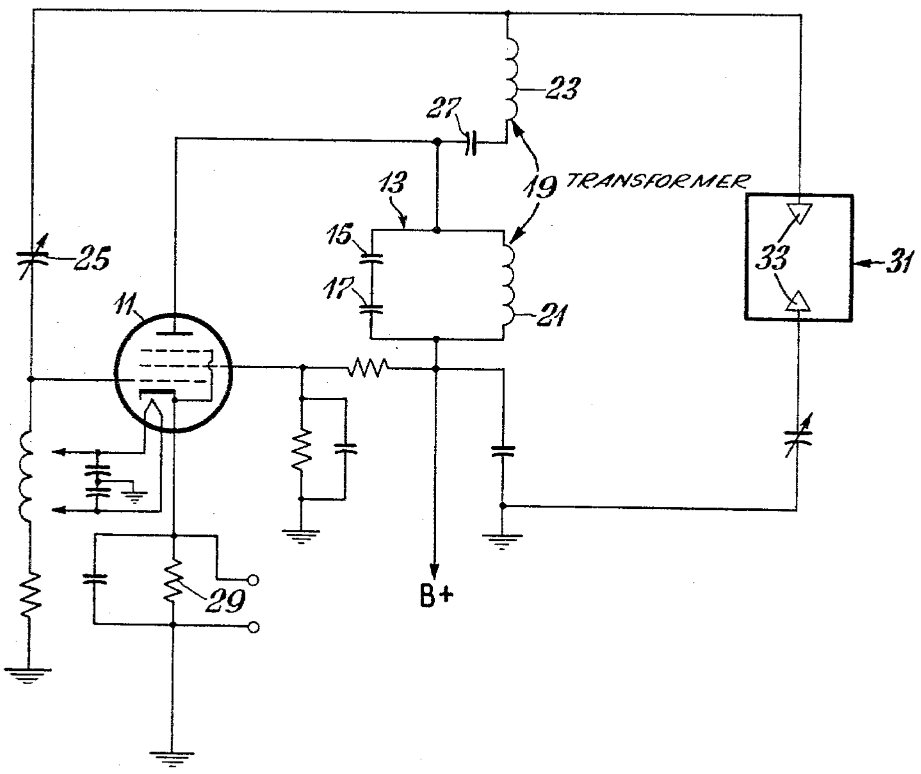
INVENTOR
CHARLES W. CAPEHART
BY Howard K. Kothe
ATTORNEY 3,241,060

OSCILLATOR-DETECTOR FOR MEASURING IMPEDANCE VARIATIONS IN LC-TRANSFORMER COUPLED LOADS

Charles W. Capehart, Charleston, W. Va., assignor to Union Carbide Corporation, a corporation of New York Filed Apr. 27, 1961, Ser. No. 106,065
3 Claims. (Cl. 324—57)

The present invention relates to an electronic system and method for simultaneously developing a selectable frequency oscillating signal, detecting minute impedance changes in a load to which said oscillating signal is applied and producing an output signal proportional to the load impedance variations. The apparatus of the present invention is especially useful as a power source and detector in gas stream analyzer apparatus which employ electric corona discharge to effect analysis.

The method for detecting and quantitatively evaluating impedance variations in a variable impedance load according to my invention comprises the simultaneous steps of impressing an oscillating signal across said load, developing a continuous varying signal across said load which signal is proportional to impedance variations in said load, impressing said varying signal upon a stimulus source, such as a vacuum tube grid, of said oscillator, detecting modulations in said oscillating signal occasioned by the varying signals impressed on the oscillator stimulus source and translating the detected modulations to an indicator-recorder apparatus. In general, apparatus according to the present invention comprises, in combination, a selectable frequency self-sustained oscillator having a feed back circuit and a tuned tank circuit. Coupling means are provided between the tank circuit and a variable impedance load. Between said variable impedance load and the feed back circuit of said oscillator, a circuit connection is provided which, in effect, parallels the load across an oscillator stimulus signal source. A detector in circuit with said oscillator is adapted to develop output signals proportional to current through the variable impedance load and output terminals are provided at this detector to facilitate connection of a suitable indicator-recorder means.

The novel features which are considered as characteristic for the present invention are set forth in particular in the appended claims. The invention itself however, both as to its construction in and its method of operation, together with a typical utilization thereof, will be best understood from the following description of a specific embodiment when read in conjunction with the accompanying drawing which is a schematic diagram of an oscillator-detector according to the present invention, used in a corona discharge type gas analyzer.

With reference to the drawing, an oscillator-detector according to the present invention comprises a vacuum tube 11 having a control grid, a plate and a cathode, which, in the embodiment described is a pentode, in circuit with a tuned plate tank 13. Tank 13 comprises capacitors 15 and 17 and primary winding 21 of transformer 19, which are selected to attain the desired oscillator frequency. Oscillator feedback is circuited from tank 13 to the control grid of tube 11 through capacitor 25, and oscillator output is applied to an electrode 33 of a corona analyzer detector cell 31 through a secondary winding 23 of transformer 19 and capacitor 27 in an LC coupling arrangement. Since primary winding 21 of transformer 19 is in circuit with a plate of tube 11 as an inductor in tank 13, a voltage of self-induction proportional to the oscillator frequency is produced across this winding, adding to the voltage amplification realized through the transformer turns ratio and effecting an oscillator voltage output level sufficiently high to produce corona at the electrodes 33.

Detector cell 31 is also capacitively coupled into the oscillator feedback circuit through capacitor 25, effectively loading the control grid of tube 11. Since the oscillator control grid is a relatively high input impedance point, load variations caused by corona impedance changes in detector cell 31 cause corresponding changes in plate current of tube 11, which, in turn, cause varying amplitude signals to appear across cathode biasing resistor 29 at the output terminals associated therewith. These signals are directed to an indicator-recorder apparatus such as a recording potentiometer. Persons familiar with the art will recognize that this arrangement comprises a cathode follower which can be readily adapted to effect an impedance match between the relatively high impedance corona in detector cell 15 and a relatively low impedance indicating-recording apparatus. The functions of other circuit parameters shown in the drawing which are undesignated will be apparent to persons skilled in the electronics art since these comprise known elements used in customary arrangements for filtering, biasing, coupling and the like.

In operation with a corona type gas analyzer, circuit parameters comprised in my invention are selected and adapted to produce radio-frequency oscillations which produce corona discharge at the electrodes 33 of cell 31. A gas mixture including components of interest in the analysis is directed into cell 31 and through the corona discharge zone between the electrodes, where it is ionized. The corona discharge current between the electrodes varies according to the concentration of particular gas components of interest since the current depends upon the ionic concentration of the medium between the detector cell electrodes. The corona thus acts as a variable impedance load in parallel with feedback capacitor 25 on the control grid of tube 11, which load varies according to the concentration of ionized gas components within it, and which loads the oscillator plate circuit accordingly. This plate circuit loading is continuously monitored by any suitable indicating or recording apparatus through the cathode follower arrangement described above. A potentiometer strip chart recorder, when used in such an application, can be conveniently calibrated in units of gas concentration.

It is to be understood that the form of the invention herewith shown and described is to be taken as the preferred embodiment of the same and in a representative application and that various changes, substitutions and omissions of components may be made without departing from the spirit of the invention or the scope of the appended claims.

What is claimed is:

1. An electronic oscillator-detector system comprising, in combination, a selectable frequency self-sustained oscillator having a feedback circuit and a tuned tank circuit, an inductor of said tuned tank circuit being a first winding on a transformer; LC coupling means between said tank circuit and a variable impedance load, an inductor of said LC coupling means being a second winding on said transformer; a circuit connection between said variable impedance load and the feedback circuit of said oscillator; a detector in circuit with said oscillator and developing output signals proportional to current through said variable impedance load; and output terminals in circuit with said detector.

2. A system according to claim 1 in which said detector comprises a cathode follower.

3. An electronic system for simultaneously developing a selectable frequency first signal, detecting minute impedance variations in a load to which said first output signal is applied and developing a second signal having an amplitude proportional to said impedance variations comprising, in combination, a multielectrode vacuum tube having a relatively high input impedance grid, a cathode and a plate; a tank circuit tuned to resonate at a preselected frequency in circuit with said plate, an inductor of said tuned tank circuit being a first winding on a transformer; LC coupling means between said tank circuit and said load, an inductor of said LC coupling means being a second winding on said transformer; a feedback capacitor in circuit with said load and said grid, said feedback capacitor being of a capacitive value to produce sustained oscillations in said tank; a resistor in circuit with said cathode; and output terminals in circuit with said resistor.

References Cited by the Examiner

UNITED STATES PATENTS

| | | | |
|---|---|---|---|
| 2,449,739 | 9/1948 | Duttera | 324—57 X |
| 2,617,856 | 11/1952 | Erwin | 324—57 |

WALTER L. CARLSON, *Primary Examiner.*

SAMUEL BERNSTEIN, *Examiner.*